(12) United States Patent
Apostolopoulos et al.

(10) Patent No.: US 12,393,700 B1
(45) Date of Patent: *Aug. 19, 2025

(54) IDENTIFYING AN UPDATE OF A CODE DEPENDENCY TO USE BASED ON RISK AND BENEFIT TRADE-OFFS

(71) Applicant: Endor Labs Inc, Palo Alto, CA (US)

(72) Inventors: Georgios Apostolopoulos, San Jose, CA (US); Philip Hamer, Palo Alto, CA (US)

(73) Assignee: Endor Labs Inc, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/069,793

(22) Filed: Mar. 4, 2025

Related U.S. Application Data

(63) Continuation of application No. 18/951,189, filed on Nov. 18, 2024, which is a continuation of application
(Continued)

(51) Int. Cl.
    *G06F 21/57*      (2013.01)
    *G06F 21/62*      (2013.01)
(Continued)

(52) U.S. Cl.
CPC ........ *G06F 21/577* (2013.01); *G06F 21/6218* (2013.01); *G06F 21/552* (2013.01); *G06F 21/565* (2013.01); *G06F 21/70* (2013.01)

(58) Field of Classification Search
None
See application file for complete search history.

(56) References Cited

U.S. PATENT DOCUMENTS

| | | |
|---|---|---|
| 7,359,865 B1 | 4/2008 | Connor et al. |
| 9,064,134 B1 | 6/2015 | Agarwal |

(Continued)

FOREIGN PATENT DOCUMENTS

| | | | | |
|---|---|---|---|---|
| CN | 111190641 A | * | 5/2020 | ............ G06F 8/315 |
| CN | 112083945 A | * | 12/2020 | ............... G06F 8/61 |

(Continued)

OTHER PUBLICATIONS

Riivo Kikas, Georgios Gousios, Marlon Dumas, and Dietmar Pfahl (Structure and Evolution of Package Dependency Networks) pp. 11; Published on IEEE Jul. 3, 2017.*

(Continued)

*Primary Examiner* — Ali H. Cheema
(74) *Attorney, Agent, or Firm* — Flagship Patents; Shiv S. Naimpally

(57) ABSTRACT

A computer-implemented method, a non-transitory computer-readable media, and a server for identifying an update of a code dependency to use based on risk and benefit trade-offs are described. In some implementations, a package is selected from a database and a set of dependencies associated with the package are determined. A set of upgrade candidates for a particular dependency is determined. For an upgrade candidate, issues associated with upgrading the package to use the upgrade candidate are determined, a state of a dependency graph associated with upgrading are determined, diamond dependencies in the dependency graph are determined, a number of vulnerabilities and a severity of the vulnerabilities addressed by upgrading to the upgrade candidate are determined, and a risk-benefit score associated with each upgrade candidate is determined. The upgrade candidates are prioritized based on the associated risk-benefit score to create prioritized upgrade candidates that are provided to a software developer.

20 Claims, 4 Drawing Sheets

Related U.S. Application Data

No. 18/740,976, filed on Jun. 12, 2024, now Pat. No. 12,189,788.

(60) Provisional application No. 63/680,135, filed on Aug. 7, 2024, provisional application No. 63/552,793, filed on Feb. 13, 2024.

(51) Int. Cl.
  *G06F 21/55* (2013.01)
  *G06F 21/56* (2013.01)
  *G06F 21/70* (2013.01)

(56) References Cited

U.S. PATENT DOCUMENTS

| | | | |
|---|---|---|---|
| 9,880,832 | B2 | 1/2018 | Plate et al. |
| 10,108,975 | B1* | 10/2018 | Benner .................. G06Q 50/22 |
| 10,437,702 | B2 | 10/2019 | Kalech et al. |
| 10,754,951 | B1 | 8/2020 | Tang et al. |
| 11,204,690 | B1 | 12/2021 | Hoberman et al. |
| 11,586,436 | B1* | 2/2023 | Jennings ................... G06F 8/61 |
| 12,164,647 | B2 | 12/2024 | Allen |
| 2008/0052137 | A1 | 2/2008 | Ziade et al. |
| 2008/0201705 | A1* | 8/2008 | Wookey .................. G06F 8/658 |
| | | | 717/175 |
| 2010/0185686 | A1 | 7/2010 | Weigert et al. |
| 2010/0241469 | A1 | 9/2010 | Weigert |
| 2010/0242028 | A1 | 9/2010 | Weigert |
| 2011/0246982 | A1 | 10/2011 | Wookey |
| 2013/0083030 | A1* | 4/2013 | Fukuda ..................... G06F 8/34 |
| | | | 345/440 |
| 2016/0099963 | A1 | 4/2016 | Mahaffey et al. |
| 2018/0197123 | A1 | 7/2018 | Parimelazhagan et al. |
| 2018/0239898 | A1 | 8/2018 | Haerterich et al. |
| 2018/0373507 | A1 | 12/2018 | Mizrahi et al. |
| 2019/0138717 | A1 | 5/2019 | Ben-Shalom et al. |
| 2020/0073781 | A1* | 3/2020 | Falko .................. G06F 11/3636 |
| 2020/0175174 | A1 | 6/2020 | Bakalli et al. |
| 2021/0056209 | A1 | 2/2021 | Fox et al. |
| 2021/0075814 | A1* | 3/2021 | Bulut ...................... H04L 63/20 |
| 2021/0149667 | A1* | 5/2021 | Watson ..................... G06F 8/71 |
| 2021/0173621 | A1* | 6/2021 | Fender ..................... G06F 8/71 |
| 2021/0182391 | A1 | 6/2021 | Plate |
| 2021/0360083 | A1* | 11/2021 | Duggal ................... H04L 67/34 |
| 2022/0222351 | A1* | 7/2022 | Levin ........................ G06F 8/71 |
| 2022/0383995 | A1* | 12/2022 | O'Rourke .............. G16H 50/30 |
| 2023/0004653 | A1 | 1/2023 | Shiraishi et al. |
| 2023/0061121 | A1* | 3/2023 | Tosevska .............. A61K 31/121 |
| 2023/0195901 | A1* | 6/2023 | Allen ........................ G06F 8/71 |
| | | | 726/25 |
| 2023/0305827 | A1* | 9/2023 | Dai ........................ G06F 8/658 |
| 2024/0241963 | A1 | 7/2024 | Wareus et al. |

FOREIGN PATENT DOCUMENTS

| | | | | |
|---|---|---|---|---|
| CN | 112699377 | A | | 4/2021 |
| CN | 117235608 | A | | 12/2023 |
| CN | 117235608 | B | | 12/2023 |
| CN | 117556432 | A * | 2/2024 | ............. G06F 21/57 |
| CN | 117667102 | A | | 3/2024 |
| CN | 117668327 | A | | 3/2024 |
| JP | 2011053966 | A * | 3/2011 | |
| WO | 2022222625 | A1 | | 10/2022 |

OTHER PUBLICATIONS

V. Benjamin Livshits and Monica S. Lam (Finding Security Vulnerabilities in Java Applications with Static Analysis) pp. 16; Published in (Year: 2005).*

Antonino Sabetta, Michele Bezzi, A Practical Approach to the Automatic Classification of Security-Relevant Commits, Nov. 11, 2018, 7 pages.

Daan Hommersom, Antonino Sabetta, Automated Mapping of Vulnerability Advisories onto their Fix Commits in Open Source Repositories, Mar. 24, 2021, 28 pages.

Mehdi et al., "Frankenstein: fast and lightweight call graph generation for software builds", Aug. 30, 2023, 47 pages.

Mehdi Keshani, "Scalable Call Graph Constructor for Maven", Mar. 28, 2021, 3 pages.

Stephan Neuhaus, Thomas Zimmermann, Christian Holler and Andreas Zeller (Predicting Vulnerable Software Components); pp. 12; Published on Oct. 29-Nov. 2, 2007 12 pages.

Wenlin Xu, Tong Li, Jinsong Wang, and Yahui Tang (Detecting vulnerable software functions via text and dependency features); pp. 11; Published online: Jan. 7, 2023 11 pages.

* cited by examiner

IDENTIFYING AN UPDATE OF A CODE DEPENDENCY TO USE BASED ON RISK AND BENEFIT TRADE-OFFS

The present patent application is a continuation of U.S. patent application Ser. No. 18/951,189, entitled "IDENTIFYING AN UPDATE OF A CODE DEPENDENCY TO USE BASED ON RISK AND BENEFIT TRADE-OFFS" filed on Nov. 18, 2024 which itself claims priority from (1) U.S. Provisional Application 63/552,793 filed on Feb. 13, 2024, (2) U.S. Provisional Application 63/680,135 filed on Aug. 7, 2024, (3) U.S. Non-Provisional application Ser. No. 18/740,976 filed on Jun. 12, 2024, all of which are incorporated herein by reference in their entirety and for all purposes as if completely and fully set forth herein.

BACKGROUND

In recent years, software applications have increasingly relied on third-party components, many of which are released under open-source license. These components are typically declared as dependencies in the manifest files of the software applications, e.g., by specifying the name and version of the component to be used. Prebuilt open-source components or packages are made available on package registries. Package managers download these prebuilt packages from the registries according to the dependency declarations in the applications' manifest files, making the code included within these packages available in the applications' development or runtime environments.

However, these open-source components often suffer from security vulnerabilities, which can negatively impact the applications that use them, either directly or indirectly. To determine whether a particular application is affected by these vulnerabilities, code-level information about the vulnerability, such as the identifiers of vulnerable functions and the identifiers of components that include those functions, are identified. Obtaining such information enables developers to employ program analysis techniques, such as static analysis or dynamic analysis, to study the vulnerable component and its use in the context of a given application. For example, reachability analysis, determines whether a particular function that is part of an open-source component can be reached by an application that directly or indirectly uses the particular function.

When a developer of a software package that uses a component in a third library determines that the component has a vulnerability, the developer may consider upgrading the software package to use a newer version of the component. Often, multiple newer versions of the component are available. A newer version may fix the vulnerability but may introduce other issues, including breaking the functionality of the package (e.g., causing it to function in a manner different than the developer intended, sometimes referred to as a breaking change). It is challenging and time consuming for the developer to review the newer versions available for each third party component that the developer's code uses to determine which newer version of each component to use, particularly with open source libraries that are maintained by a third party.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a package in a software project is selected and a set of dependencies associated with the package determined. A set of upgrade candidates for a particular dependency is determined. For an upgrade candidate, issues associated with upgrading the package to use the upgrade candidate are determined, a state of a dependency graph associated with upgrading are determined, diamond dependencies in the dependency graph are determined, a number of vulnerabilities addressed by upgrading to the upgrade candidate are determined, and a risk-benefit score associated with the upgrade candidate is determined. The upgrade candidates are prioritized based on the associated risk-benefit score to create prioritized candidates. The prioritized candidates are provided to a developer associated with the package.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
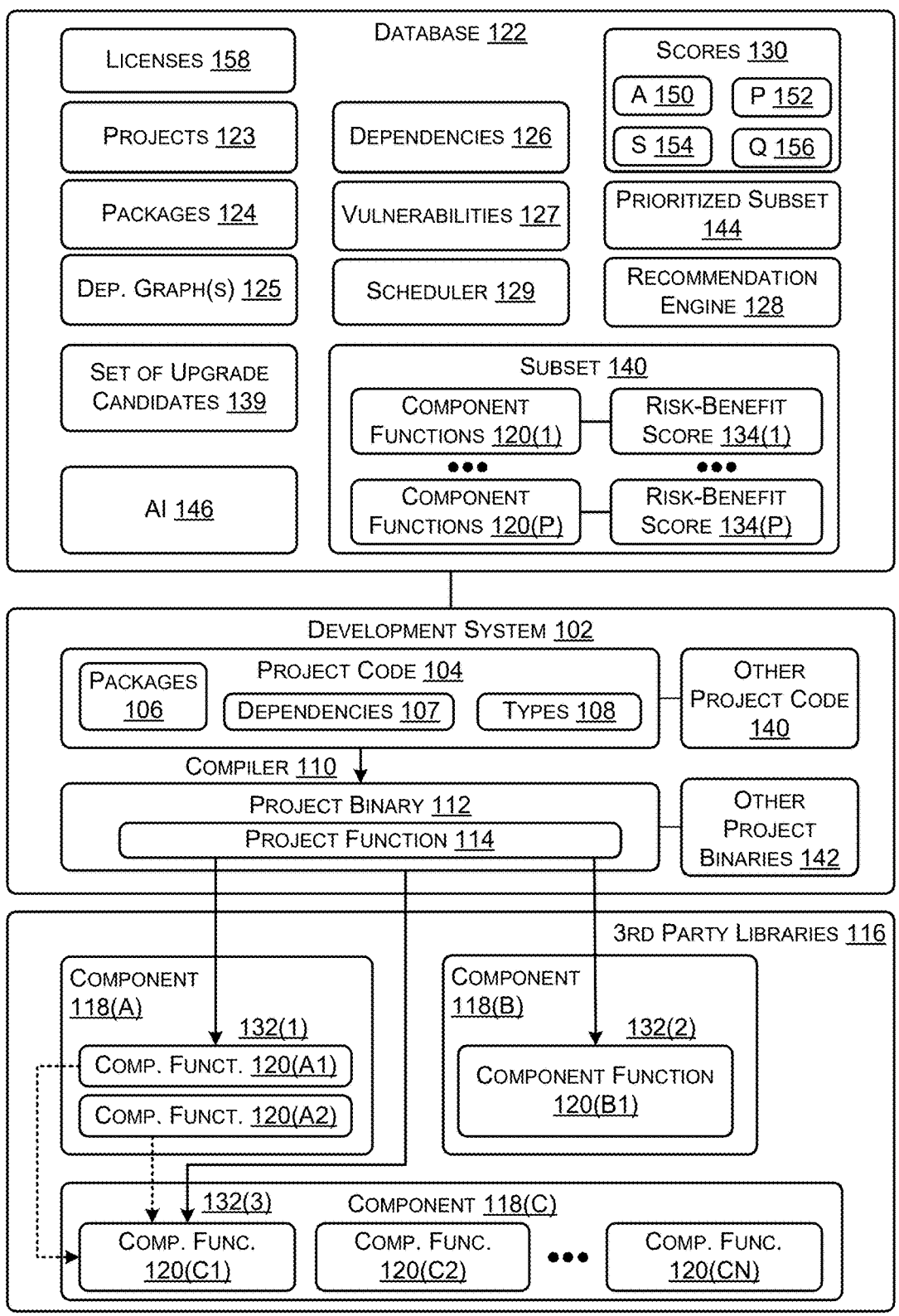
FIG. 1 is a system illustrating a system to create a prioritized subset of upgrade candidates, according to some embodiments.

It should be understood, that the following descriptions, while indicating preferred aspects and numerous specific details thereof, are given by way of illustration only and should not be treated as limitations. Changes and modifications may be made within the scope herein without departing from the spirit and scope thereof, and the present invention herein includes all such modifications.

The systems and techniques enhance the security of software applications that use third-party components by determining when to upgrade to a new version of a third-party component and identifying a "best" version. The best version refers to a particular version of a component that is determined to introduce the least amount of issues after upgrading project code to use the particular component. For example, if multiple new versions of a component are available, the systems and techniques may analyze the dependency graphs associated with each version to determine which version is least likely to introduce issues, such as a breaking change (e.g., that causes the project code to function in a manner different than the developer intended). To illustrate, each of the newer versions may address a vulnerability in an older version of the component but a first version may introduce a new issue (e.g., vulnerability) while a second version may not introduce any new issues or may introduce a new issue for which a workaround is available.

For these reasons, the systems and techniques may recommend the second version. If there are a large number of newer versions available, the systems and techniques may heuristically pare down the number of candidates to analyze, analyze the pared down candidates, determine a risk-benefit score (e.g., low, medium, high, a score from 0 to 9, a score from 0 to 100, or the like), and provide a prioritized list ordered based on the risk-benefit score (also referred to as a recommendation score), including a newer version having the lowest risk-benefit score (or a highest recommendation score). Each upgrade candidate is scored (risk-benefit score) based on a tradeoff between (1) the upgrade risk and (2) the benefit of the upgrade (vulnerabilities addressed by the upgrade). The benefit of the upgrade takes into account the number of vulnerabilities and a severity of each of the vulnerabilities addressed by the upgrade. For example, given the same upgrade risk, an upgrade that resolves one or two major (severe) vulnerabilities receives a better risk-benefit score than an upgrade that resolves three or four relatively minor vulnerabilities.

Project code that uses (e.g., has a dependency) on a third-party component is typically upgraded when there is a newer version that is "better" than the current version that is currently being used by the project code. A newer version that is better means the newer version addresses issues (e.g., vulnerabilities) present in the current version and, based on an analysis of the dependency graph, does not appear to introduce new issues. Such a version may receive a highest recommendation score (lowest risk-benefit score). Determining when to upgrade and to which version to upgrade is very time consuming for a developer. The systems and techniques described herein dramatically reduce the amount of developer time used to maintain the dependencies of a project by performing an analysis of a set of possible updates and providing an ordered subset of one or more recommended updates.

A software development project ("project") includes project code (also referred to as source code) comprised of one or more packages. Each package has dependencies that are introduced when the source code imports (references) components in third-party libraries, such as open-source software libraries. Individual components may have multiple versions, with each version having a set of (zero or more) known vulnerabilities. Each version may have an associated set of scores including, for example, quality scores, security scores, popularity scores, activity scores, and other factors, such as number of licenses.

The systems and techniques maintain a database that includes information about multiple projects in the software development system, the packages included in each project, dependencies (e.g., third party components used by) each of the packages, vulnerabilities associated with each of the dependencies, and one or more scores associated with each of the vulnerabilities. A scheduler periodically or in response to an occurrence of a particular event, determines when an analysis of the multiple projects takes place. The particular event may include, for example, (1) publication of a new version of a third-party component used by one of the packages, (2) discovery of a new vulnerability in a dependency, or (3) a change to the project code that introduces and/or removes one or more dependencies.

As a first example, a computer-implemented method includes selecting a package in a software project and determining a set of dependencies associated with the package. The dependencies are located in third-party libraries. The method includes determining a set of upgrade candidates for a particular dependency in the set of dependencies and, based on determining that the number of upgrade candidates in the set of upgrade candidates is greater than a predetermined threshold, heuristically selecting a subset of the upgrade candidates. If the number of upgrade candidates in the set of upgrade candidates is less than or equal to the predetermined threshold, then the set of upgrade candidates is selected as the subset of upgrade candidates. The method includes determining issues associated with upgrading the package to use the upgrade candidate, emulating a state of a dependency graph associated with upgrading the package to use the upgrade candidate, determining diamond dependencies in the dependency graph associated with upgrading the package to use the upgrade candidate, determining a number of vulnerabilities addressed by upgrading the package to use the upgrade candidate, and determining a severity of vulnerabilities addressed by upgrading the package to use the upgrade candidate. The method includes determining a risk-benefit score associated with each upgrade candidate in the subset based at least in part on: (1) the issues associated with upgrading the package to use the upgrade candidate, (2) the diamond dependencies in the dependency graph associated with upgrading the package to use the upgrade candidate, (3) the number of vulnerabilities addressed by upgrading the package to use the upgrade candidate, and (4) a severity of the vulnerabilities addressed by upgrading the package to use the upgrade candidate. The method includes prioritizing each upgrade candidate in the subset based on the associated risk-benefit score to create a prioritized subset. The method may include providing the prioritized subset to a developer associated with the package. In some cases, the method may include automatically (without human interaction) upgrading the package to use the highest priority upgrade candidate. Determining the issues associated with upgrading the package to use the upgrade candidate may include determining a number of breaking changes associated with upgrading the package to use the upgrade candidate. Determining the issues associated with upgrading the package to use the upgrade candidate may include determining an activity score indicating an amount of development activity associated with a third-party package in which the upgrade candidate is included. Determining the issues associated with upgrading the package to use the upgrade candidate may include determining a security score indicating a number of security-related issues associated with a third-party package in which the upgrade candidate is included. Determining the issues associated with upgrading the package to use the upgrade candidate may include determining a popularity score indicating an amount of usage received by a particular third-party package based at least in part on: (1) tracking source code management system metrics and (2) how many other packages have a dependency on the particular package. Determining the issues associated with upgrading the package to use the upgrade candidate may include determining a code quality score indicating how well a particular third-party package complies with best practices for code development. Determining the issues associated with upgrading the package to use the upgrade candidate may include determining a number of licenses associated with the upgrade candidate.

As a second example, a server includes one or more processors and one or more non-transitory computer readable media storing instructions executable by the one or more processors to perform various operations. The operations include selecting a package in a software project and determining a set of dependencies associated with the package. The dependencies are located in one or more third-party libraries. The operations include determining a set of upgrade candidates for a particular dependency in the set of dependencies. Based on determining that the number of upgrade candidates in the set of upgrade candidates is greater than a predetermined threshold, the operations include heuristically selecting a subset of the upgrade candidates. Based on determining that the number of upgrade candidates in the set of upgrade candidates is less than or equal to the predetermined threshold, the operations include selecting the set of upgrade candidates as the subset. The operations include selecting an upgrade candidate in the subset, determining issues associated with upgrading the package to use the upgrade candidate, emulating a state of a dependency graph associated with upgrading the package to use the upgrade candidate, determining diamond dependencies in the dependency graph associated with upgrading the package to use the upgrade candidate, determining a number of vulnerabilities addressed by upgrading the package to use the upgrade candidate, and determining a severity of vulnerabilities addressed by upgrading the package to use the upgrade candidate. The operations include determining a risk-benefit score associated with each upgrade candidate in the subset based at least in part on: (1) the issues associated with upgrading the package to use the upgrade candidate, (2) the diamond dependencies in the dependency graph associated with upgrading the package to use the upgrade candidate, (3) the number of vulnerabilities addressed by upgrading the package to use the upgrade candidate, and (4) a severity of the vulnerabilities addressed by upgrading the package to use the upgrade candidate. The operations include prioritizing each upgrade candidate in the subset based on the associated risk-benefit score to create a prioritized subset. The operations may include providing the prioritized subset to a developer associated with the package. In some cases, the operations may include automatically (without human interaction) upgrading the package to use the highest priority upgrade candidate. Heuristically selecting the subset of the upgrade candidates may include selecting a predetermined number of early versions of the upgrade candidates and selecting a predetermined number of later versions of the upgrade candidates. The third-party libraries may include at least one open-source library. Determining the issues associated with upgrading the package to use the upgrade candidate may include determining a number of breaking changes that would result from upgrading the package to use the upgrade candidate. Determining the set of dependencies associated with the package may include ignoring test dependencies and ignoring unused dependencies. The operations may include determining a recommended upgrade candidate for each dependency in the set of dependencies across multiple projects with each project of the multiple projects including one or more packages and determining a set of upgrade candidates for the multiple projects. Determining the issues associated with upgrading the package to use the upgrade candidate may include determining a number of licenses associated with the upgrade candidate.

As a third example, one or more non-transitory computer readable media capable of storing instructions are executable by one or more processors to perform various operations. The operations include selecting a package in a software project and determining a set of dependencies associated with the package. The dependencies are located in third-party libraries. The operations include determining a set of upgrade candidates for a particular dependency in the set of dependencies. Based on determining that the number of upgrade candidates in the set of upgrade candidates is greater than a predetermined threshold, the operations include heuristically selecting a subset of the upgrade candidates. Based on determining that the number of upgrade candidates in the set of upgrade candidates is less than or equal to the predetermined threshold, the operations include selecting the set of upgrade candidates as the subset. The operations include selecting an upgrade candidate in the subset. The operations include determining issues associated with upgrading the package to use the upgrade candidate, emulating a state of a dependency graph associated with upgrading the package to use the upgrade candidate, determining diamond dependencies in the dependency graph associated with upgrading the package to use the upgrade candidate, determining a number of vulnerabilities addressed by upgrading the package to use the upgrade candidate, and determining a severity of the vulnerabilities addressed by upgrading the package to use the upgrade candidate. The operations include determining a risk-benefit score associated with each upgrade candidate in the subset based at least in part on: the issues associated with upgrading the package to use the upgrade candidate, the diamond dependencies in the dependency graph associated with upgrading the package to use the upgrade candidate, the number of vulnerabilities addressed by upgrading the package to use the upgrade candidate, and a severity of the vulnerabilities addressed by upgrading the package to use the upgrade candidate. The operations include prioritizing each upgrade candidate in the subset based on the associated risk-benefit score to create a prioritized subset. The operations may include providing the prioritized subset to a developer associated with the package. In some cases, the operations may include automatically (without human interaction) upgrading the package to use the highest priority upgrade candidate. Determining the issues associated with upgrading the package to use the upgrade candidate may include determining a number of breaking changes associated with upgrading the package to use the upgrade candidate. Determining the issues associated with upgrading the package to use the upgrade candidate may include determining an activity score indicating an amount of development activity associated with a third-party package in which the upgrade candidate is included. Determining the issues associated with upgrading the package to use the upgrade candidate may include determining a security score indicating a number of security-related issues associated with a third-party package in which the upgrade candidate is included. Determining the issues associated with upgrading the package to use the upgrade candidate may include determining a popularity score indicating an amount of usage received by a particular third-party package based at least in part on: (1) tracking source code management system metrics and (2) how many other packages have a dependency on the particular package. Determining the issues associated with upgrading the package to use the upgrade candidate may include determining a code quality score indicating how well a particular third-party package complies with best practices for code development.

FIG. 1 is a system 100 illustrating the components and relationships within a software development system, according to some embodiments. The system 100 includes a development system 102, project code 104, packages 106, dependencies 107, and types 108. The development system 102 includes a compiler 110, a project binary 112 (binary code created by compiling the project code 104), a representative project function 114, 3rd party libraries 116, components 118(A), 118(B), sub-component 118(C), component functions 120(A1), 120(B1), 120(C1), 120(C2), and relationships (dependencies) 132(1), 132(2), 132(3), 132(4).

The relationships may include any type of relationship between the project function 114 and component functions 120 in the third-party libraries 116.

The development system 102 is a software environment that allows software developers to facilitate the creation, modification, and management of the project code 104. The project code 104 includes the source code files of the software project that may be managed using a version control system (VCS), such as Git or Mercurial.

The types 108 and dependencies 107 include metadata associated with the project code 104. The types 108 may include information about the data types used in the project code 104, while the dependencies 107 may include information about the other software components that the project code (104) relies on for its functionality.

The compiler 110 is a software tool that transforms the project code 104 into the project binary 112. The project binary 112 is the executable form of the software project that can be run on a computer system. The representative project function 114 is a specific part of the project code 104 that performs a particular task within the software project. Typically, a project binary has multiple project functions. For ease of understanding, the representative project function 114 is used to illustrate the function of the systems and techniques, The 3rd party libraries 116 are software components that are not developed by the project maintainers but are used within the software project to provide certain functionalities. These libraries can include components 118(A), 118(B), and sub-component 118(C) that provide specific functionalities used by the project code 104 (and the project binary 112).

The system 100 includes the development system 102 used by one or more programmers to create code, such as representative project code 104. The project code 104 is also referred to as source code and is written in a high-level language. The project code 104 may include types 108 that are explicitly defined and implicitly inherited. The project code 104 includes relationships 108 that are explicitly defined and implicitly inherited. FIG. 1 is merely an example to illustrate the systems and techniques. It should be understood that in practice, the development system 102 may include multiple project code being developed and each project code, such as the representative project code 104, may include tens or even hundreds of calls to components in third-party libraries. The development system 102 may include other project code 140 and corresponding other project binaries 142.

A compiler 110 may be used to compile the project code 104 to create a project binary 112. The project binary 112 may be an intermediate code (e.g., byte code) that is interpreted by a virtual machine, machine level code, or any combination thereof. The project binary 112 may implement at least one project function 114 to provide a particular type of functionality. The development system 102 may include other project code 128 and other project binaries 130 that are compiled versions of the other project code 128. The project code 104 may include dependencies 107 that identify portions of the other project code 128 that depends on (e.g., is called by or calls) the project code 128. The project binary 112 includes the dependencies 107, with portions of the other project binaries 130 depending on (e.g., called by or calling) the project binary 112. The compiler 110 may be used to compile the other project code 140 to create the other project binaries 142.

The project function 114 makes a call to one or more components in one or more third-party libraries 116. The one or more third-party libraries 116 may include open-source libraries or other types of libraries. Each component function 120 shown in FIG. 1 is a compiled file that is in a binary or intermediate code (e.g., bytecode) format. For illustration purposes, components 118(A), 118(B), and 118(C) are shown in the third-party libraries 116. However, it should be understood that these are merely examples and that the project function 114 may use hundreds or even thousands of components accessible via third-party libraries 116. For illustration purposes, the component 118(A) includes at least component functions 120(A1), 120(A2), the component 118(B) includes a component function 120(B1), and the component 118(C) includes sub-component function versions 120(C1) to 120(CN) (N>0).

For illustration purposes, the project function 114 has a relationship 132(1) (a dependency) to component function 120(A1), a relationship 132(2) to component function 120 (B1), and a relationship 132(3) to component function 120(C1). For example, the relationships 132 may include importing a type, making a call (from a project function to a component function), or another type of dependency. The relationships 132(1), 132(2), and 132(3) are direct dependencies. If component function 120(A1) has a relationship with component function 120(C1) (as illustrated by the dotted arrow), then the project function 114 has a direct dependency to component function 120(A1) and an indirect (also referred to as a transitive) dependency to component function 120(C1). Such transitive dependencies can give rise to diamond dependencies. For example, in FIG. 1, the component function 118(A) has a function with two versions, component function 120(A1) (version A1) and component function 120(A2) (version A2). Assume component functions 120(A1) and component function 120(A2) both have a dependency on component function 120(C1), as illustrated by the dotted arrows in FIG. 1. Assume that the developer discovers an issue with component function 120 (A1) and therefore upgrades to using component function 120(A2). For example, the developer modifies project function 114 to call component function 120(A2) instead of component function 120(A1). If the issue attributed to component function 120(A1) is actually caused by the transitively referenced function, component function 120 (C1), then modifying the project function 114 to use component function 120(A2) instead of component function 120(A1) will not resolve the issue. For this reason, the system 100 determines dependency graphs to identify diamond dependencies and provide upgrade recommendations to the developer that take into account the diamond dependencies. If the diamond dependencies were not discovered, the developer might, for example, modify project function 114 to use component function 120(A2) instead of component function 120(A1), and still have the issue (e.g., vulnerability) caused by the transitively referenced function, component function 120(C1).

A database 122 is communicatively coupled to the development system 102. The database 122 includes multiple projects 123 in the development system 102, packages 124 used by each of the projects 123, dependencies 126 associated with each of the packages 124, and known vulnerabilities 127 associated with the dependencies 127.

A scheduler 129 causes a recommendation engine 128 to execute periodically (e.g., at a pre-determined time interval, such as every day, every week, or the like) or in response to an occurrence of a particular event, such as discovery of a new vulnerability associated with one or more of the dependencies 126. For each particular project of the projects 123, the recommendation engine 128 determines the associated packages 124. For each of the packages 124, the recommendation engine 128 determines the associated dependencies 126. For each particular dependency (in the dependencies 126) associated with a particular package of the packages 124, the recommendation engine 128 determines if the dependency is to be analyzed.

Ignoring Particular Types of Dependencies

The recommendation engine 128 may ignore certain types of direct dependencies, based on how the recommendation engine 128 is configured. For example, the recommendation engine 128 may ignore test dependencies. A test dependency provides a test-related functionality (e.g., dump of values of local parameters or other troubleshooting-related functionality, or the like) and is used when developing the code. After code development is complete and the code is deployed, the test dependency is not present. Thus, any vulnerabilities associated with the test dependency do not matter. The recommendation engine 128 may ignore unused dependencies. An unused dependency is a dependency that is declared but not actually used in the code. Thus, the recommendation engine 128 can ignore any vulnerabilities related to an unused dependency. The recommendation engine 128 may ignore dependencies that have no vulnerabilities. In this case, even though the dependency is used, the dependency does not have any vulnerabilities. The software developer may not want to go to the trouble of upgrading the dependency because the dependency does not introduce any vulnerabilities. The configuration of the recommendation engine 128 is something that is under the control of the software developer. For example, the software developer can select "ignore test dependencies" or "ignore unused dependencies" in the settings and these selections will configure the recommendation engine 128 accordingly.

For each particular dependency (in the dependencies 126), the recommendation engine 128 determines a set of (one or more) upgrade candidates 139. If a number of upgrade candidates 139 satisfies a particular threshold, then the recommendation engine 128 may heuristically trim the set of upgrade candidates 139 to create a subset 140 (of upgrade candidates) to reduce the execution time. For example, the subset 140 may include component functions 120(1) to 120(P), where $0<P<=N$.

Detect Breaking Changes

For each upgrade candidate (component functions 120(1) to 120(P)) in the subset 140, the recommendation engine 128 determines whether the upgrade would cause a breaking change. The process of detecting breaking changes is described in more detail in patent application Ser. No. 18/740,976, from which this application claims priority and which is incorporated herein in its entirety by reference. Determining whether an upgrade candidate would cause a breaking change takes as input a high-level description of a vulnerability associated with an open-source component and produces as output an enriched vulnerability description that includes code-level information about affected functions and affected component versions. Based on a security advisory, the recommendation engine 128 determines an existence of a vulnerability in a function in a third-party library. For example, an artificial intelligence (AI) 146 may determine information about one of the vulnerabilities 127 in one of the functions 120 from the security advisory. The security advisory may be published by the National Vulnerability Database (NVD) or another similar organization. The recommendation engine 128 determines vulnerability data, including function versions (e.g., 120(C1), 120(C2), to 120(CN)) associated with a particular function of the functions 120.

The recommendation engine 128 may determine a commit history associated with the particular function (that was identified in the security advisory). Each commit includes both (1) the actual code changes, e.g., lines of code that have been added, removed, and/or changed in particular source code files, as well as (2) metadata, such as author information, a textual summary of the changes, a timestamp, other change-related information, or any combination thereof. The recommendation engine 128 may determine fix commits associated with the particular function, based on the commit history. Fix commits are a set of the particular changes (commits) that change the project's source code by fixing or otherwise resolving the vulnerability. The identification of fix commits may be done using various techniques, including using an artificial intelligence AI 146. In some cases, the commits, which are a textual description or summary of the changes, may include either a function identifier or a description of the vulnerability, similar to what is described in vulnerability information included in the advisory. In other cases, the code changes in the third-party libraries 116 may be analyzed to determine whether a particular commit is related to the vulnerability. The set of candidate commits may be reduced by comparing commit timestamps, publication dates of vulnerability disclosure, and the like. In some cases, additional resources may be used to identify fix commits, such as other documents that discuss or describe the vulnerability, e.g., tickets in project management software (e.g., Jira), or resources describing how to exploit the vulnerability.

The fix commits may be used to identify functions 120 affected by the vulnerability and to determine the functions 120 that have been modified to address the vulnerability by one of the commits. For example, this may be done by comparing the files before and after a change is made, using either their textual representation or using various abstractions and representations of source code, such as abstract syntax trees. In some cases, functions that are not directly related to the vulnerability may be excluded to keep the data being analyzed to a manageable amount. For example, functions 120 may be included as part of fix commits, if the developers, in addition to providing a fix for the vulnerability, performed other changes at the same time and included them in the commit, e.g., the fix commit was not limited to the vulnerability. A resulting set of functions may include both (1) the signature of the respective function, as well as (2) different representations of the functions, such as, for example, abstract syntax trees, data or control flow graphs, bytecode, and the like.

The recommendation engine 128 may perform a search to identify components and component versions that include the affected functions (e.g., functions affected by the vulnerability). The recommendation engine 128 may search downloaded packages to determine if the function affected by the vulnerability is included and if so which version of the function is included. The recommendation engine 128 may determine identifiers of package versions that include fixed or vulnerable versions of the function. For example, a search may be performed by obtaining packages from package registries (e.g., the third-party libraries 116, such as Maven Central, npm registry, or the like) and determining whether they include the function in the vulnerable form or in a fixed form. For example, some package registries may provide a search function to facilitate performing such a search, while other package registries may be downloaded and indexed to enable the entire package registries to be searched. In some cases, the code portion of downloaded packages may be searched and compared against affected functions to determine not only whether the function is included, but whether the function is included in the vulnerable form or the fixed form (vulnerability addressed). Such a comparison may involve the source code representation, abstractions thereof (e.g., abstract syntax trees or control flow graphs), their compiled form, or any combination thereof.

The result is an enhanced vulnerability description that includes information about functions affected by one or more vulnerabilities, including their signatures as well as representations of vulnerable and fixed function bodies, e.g., the source code as found in the version control system (VCS), or other representations, depending on the programming language, as well as abstract syntax trees, control and data flow graphs, bytecode, compiled code, or any combination thereof. In some cases, the results may include identifiers of package versions that include fixed or vulnerable versions of the affected functions. Vulnerable functions within the context of software development projects may be identified by searching the commit history of an open-source project (e.g., Github) repository for fixes. In addition, vulnerability databases, such as npm and the like, that document vulnerabilities for which a fix is available, may be searched. The project code 104 in the development system 102 may be modified in such a way that the project code 104 uses the fixed versions of the function and does not use vulnerable version of the function. Thus, vulnerability databases may be augmented using various types of analysis, including reachability analysis. The recommendation engine 128 may query vulnerability databases for component names of components that include a vulnerability. In many systems, such as the Java ecosystem, code that includes a vulnerability may be copied and used in multiple components with each of the multiple components having different names. Thus, the systems and techniques search third-party libraries for code segments that include known vulnerabilities, including code segments that have been reused in multiple components.

The recommendation engine 128 may emulate a state of a dependency graph 125 after the candidate upgrade and determine potential issues, such as diamond dependencies. A diamond dependency occurs when a current version and a newer version of a component in a third party library both have a dependency on (e.g., use) a same sub-component. If the sub-component has an issue (e.g., vulnerability), then upgrading to the newer version will not address the vulnerability.

The recommendation engine 128 determines the previously mentioned information (e.g., vulnerabilities, breaking changes, diamond dependencies, and the like) and determines the number of issues (e.g., vulnerability and the like) that will be fixed if an upgrade is performed. The recommendation engine 128 determines additional information associated with each upgrade candidate version, such as, for example, a quality score, a security score, popularity, an activity score and other factors such as licenses 158 and the like. The recommendation engine 128 combines the above information into a risk-benefit score that describes the potential improvements and potential risks if the upgrade is performed.

Scores

The recommendation engine 128 collects and analyzes a large amount of information associated with (1) the packages 124 (that includes the packages 106 specific to the project code 104) and (2) the components in the third-party libraries 116 to compute scores 130. Every open-source package and private package is scored across different characteristics to capture both the security and the operational aspects of a risk. The scores 130 include, for example, activity score 150, popularity score 152, security score 154, and quality score 156. The scores 150, 152, 154, 156 provide a high-level, easy-to-understand metric associated with a particular characteristic (e.g., security, activity, popularity, and code quality) of a package.

The security score 154 indicates the number of security-related issues associated with a particular third-party (e.g., open-source) package, including known vulnerabilities, how well the package developers follow security best practices when developing the code for the package, and the results of static code analysis. Packages with a lower security score 154 have more security-related issues when compared with packages with a higher security score 154.

The activity score 150 indicates the level of development activity associated with a particular third-party (e.g., open-source) package based on information provided by the source code management system in which the package is developed. A particular package with a higher activity score 150 has more active and is presumably better maintained as compared to a package with a lower activity score 150.

The popularity score 152 indicates how widely (popular) a particular package is used in its ecosystem based on (1) tracking both source code management system metrics (e.g., the number of stars in GitHub) and (2) how many other packages import (have a dependency on) the particular package. Thus, a particular package with a high popularity score 152 indicates that it is more widely used and therefore probably has fewer issues compared to a package with a lower popularity score. A package with a higher popularity score 152 is used by many people and so any issues associated with the package are likely to be identified and resolved fairly quickly compared to a less popular package.

The code quality score 156 indicates how well a particular third-party (e.g., open-source) package complies with best practices for code development and includes the results of a static code analysis of that package's source code. A package with a higher quality score 156 has fewer code issues compared to a package with a lower quality score 156.

After determining a set of upgrade candidates 139 for each of the dependencies 126, the recommendation engine 128 uses the scores 150, 152, 154, 156 to compute a risk-benefit score 134 for each upgrade candidate in the set of upgrade candidates 139. The risk-benefit score 134 may, for example, be (i) a score between 1 and 99 (with 1 indicating a low risk/high benefit and 99 indicating a high risk/low benefit), (ii) a score between 1 and 9 (with 1 indicating a low risk/high benefit and 9 indicating a high risk/low benefit), (iii) one of "low", "medium", or "high", or (iv) another type of scoring system.

The recommendation engine 128 may create a subset 140 identifying a portion of the upgrade candidates 139 having the lowest risk-benefit scores 134. For example, the subset 140 may include component functions 120(1) to 120(P) (upgrade candidates) having the N lowest risk-benefit scores (N>0). The upgrade candidates in the subset 140 may be ordered based on the risk-benefit scores 134 to create a prioritized subset 144.

In some cases, the recommendation engine 128 may heuristically trim the set of candidate upgrades 139 to reduce the number of candidates under consideration, without reducing the chances of finding a best upgrade (e.g., resolves one or more major issues, such as vulnerabilities, and has a relatively low risk-benefit score and is therefore unlikely to introduce any new issues). For example, the recommendation engine 128 may spill the upgrade candidates into version ranges (e.g. version 4.5.*, version 4.6.*, and so on) and include the first version and the last version in the range, since it is more likely for a major improvement to be introduced early in the range or vulnerabilities getting fixed towards the end of the range. To illustrate, if there are versions 4.5.1, 4.5.2, 4.5.3, 4.5.4, 4.5.5, 4.5.6, and 4.5.7, then the first version 4.5.1 and the last version 4.5.7 may be analyzed and a risk-benefit score determined for each one prior to selecting one of them as an upgrade candidate. In this way, two candidates instead of seven candidates may be analyzed, thereby reducing the time taken and use of computational resources to identify an upgrade candidate. Of course, the number of versions selected may vary based on the total number of versions that are available. For example, if there are versions 4.5.01 to 4.5.99, then a percentage (Q %) of early versions of a component in a third-party library and a percentage (Q %) of later versions of the component may be selected for analysis. To illustrate, versions 4.5.1, 4.5.2, and 4.5.3 (e.g., Q=3%) of the early versions and versions 4.5.97, 4.5.98, and 4.5.99 of the later versions may be selected for analysis. The number of versions to select is controlled by a user selectable configuration threshold.

The recommendation engine 128 may create emulations of the dependency graphs 125 that emulate a dependency graph if the individual upgrades were to be performed. The dependencies 126 are organized in a graph, with the source project as the root, a node for each dependency, and a link between node A and node B if the dependency A imports/depends on dependency B. Each version of a dependency (e.g. A@v1, A@v2) has a corresponding (different) dependency graph. If the current project uses dependency A@v1, the project's dependency graph contains, as a subset, the dependency graph of A@v1. To emulate the dependency graph after an upgrade A@v1 to A@v2, the A@v1 dependency graph is replaced with that of A@v2 and the recommendation engine 128 looks for issues. In some cases, the issues may include diamond dependencies. The recommendation engine performs an analysis to select a version that fixes issues in the direct dependency and in the transitive dependencies and avoids selecting a version that introduces a new issue (e.g., vulnerability) in the direct dependency itself or in any of the transitive dependencies.

The recommendation engine 128 selects the set of upgrade candidates 139, e.g., a portion of the available versions, such as Q % of the first versions and Q % of the last versions. The recommendation engine 128 emulates the dependency graphs for each upgrade candidate in the set of upgrade candidates 139, determines an associated risk-benefit score 134, and creates the subset 140 with the component functions 120(1) to 120(P) (upgrade candidates) with the lowest risk-benefit scores 134. The recommendation engine 128 orders the component functions 120(1) to 120(P) (upgrade candidates) based on the risk-benefit scores 134 to create the prioritized subset 144 in which the upgrade candidates are prioritized based on the risk-benefit score 134, presenting the lowest risk upgrade candidates first.

The recommendation engine 128 may operate across multiple projects. For each project, the recommendation engine 128 determines the recommended upgrades of direct dependencies At the end, do a global computation to find the recommended upgrade candidates across the multiple projects. The recommendation engine 128 aligns the upgrades across the multiple projects. For example, the recommendation engine 128 may recommend upgrading project A from dependency D@v1 to D@v4. If project A were not taken into account when determining upgrades for project B, the recommendation engine 128 may recommend upgrading project B from D@v2 to D@v3. To align recommendations across multiple projects, the recommendation engine 128 may recommend upgrading to a same version (e.g., D@v4). The result is a smaller number of different versions across all projects after the upgrade (e.g., D@v4, instead of both D@v4 and D@v3).

The recommendation engine 128 generates recommendations for upgrading a single dependency at a time (e.g. upgrade D@v1 to D@v4). In some cases, upgrading a single dependency may not be possible due to conflicts with other direct dependencies. In such cases, the recommendation engine 128 may recommend upgrading multiple direct dependencies at the same time. For example, with languages such as Java, the software developer can directly upgrade a transitive dependency to a new version. The recommendation engine 128 may be configured to determine the best upgrade for a transitive dependency.

Thus, a recommendation engine may determine when to upgrade a dependency of a package to a new version and recommend which is the best version to which to upgrade. At a high-level, a dependency may be upgraded when there is a newer version that is "better", e.g., meaning less vulnerabilities or better scores (e.g., lower risk-benefit scores) or both. Without the recommendation engine, determining when to upgrade and to which version to upgrade a dependency is very time consuming for a software developer. The recommendation engine dramatically reduces the amount of time the developer uses to maintain the dependencies of a project.

Figure 2:
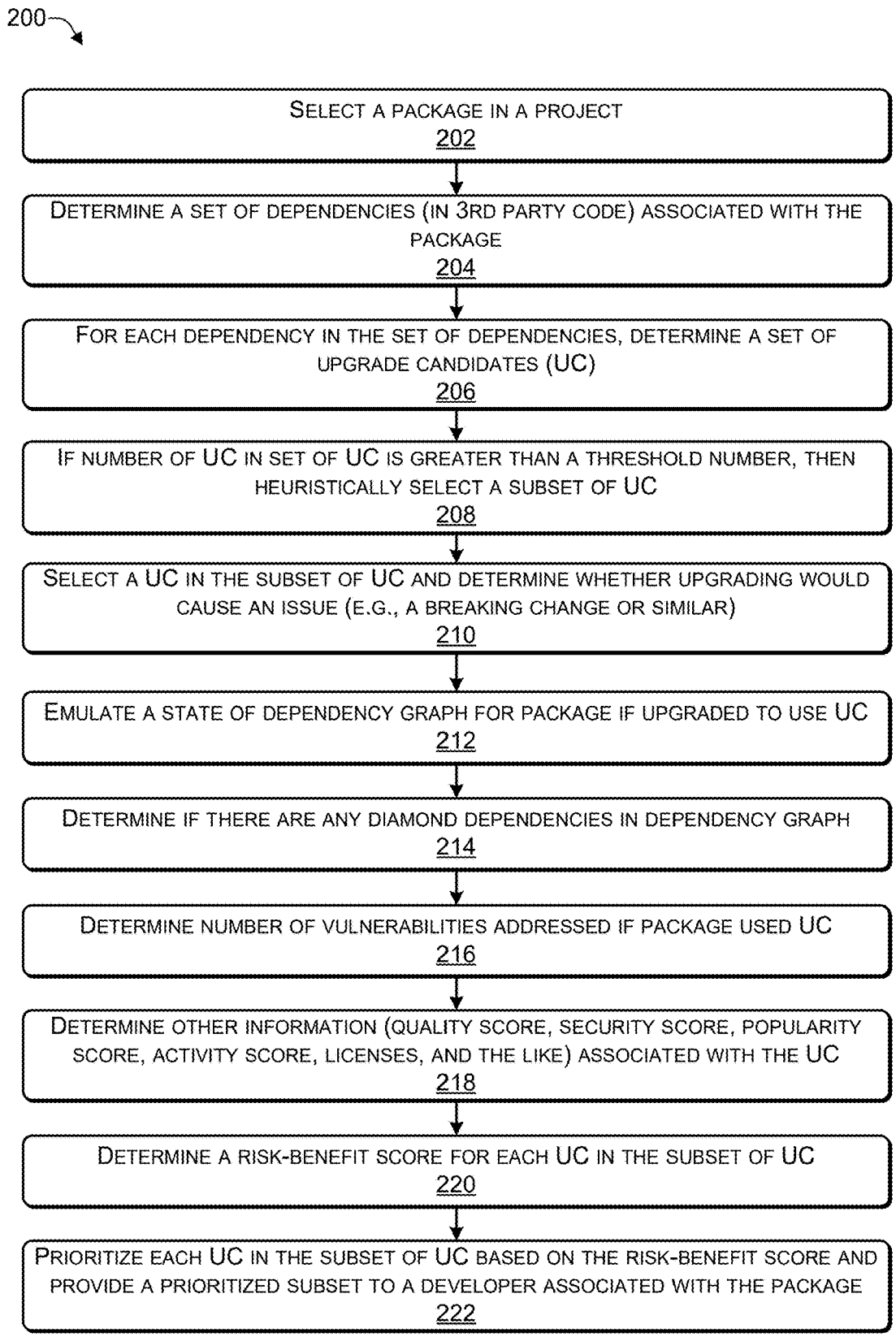
FIG. 2 is a process to create a prioritized subset of upgrade candidates, according to some embodiments.
Figure 3:
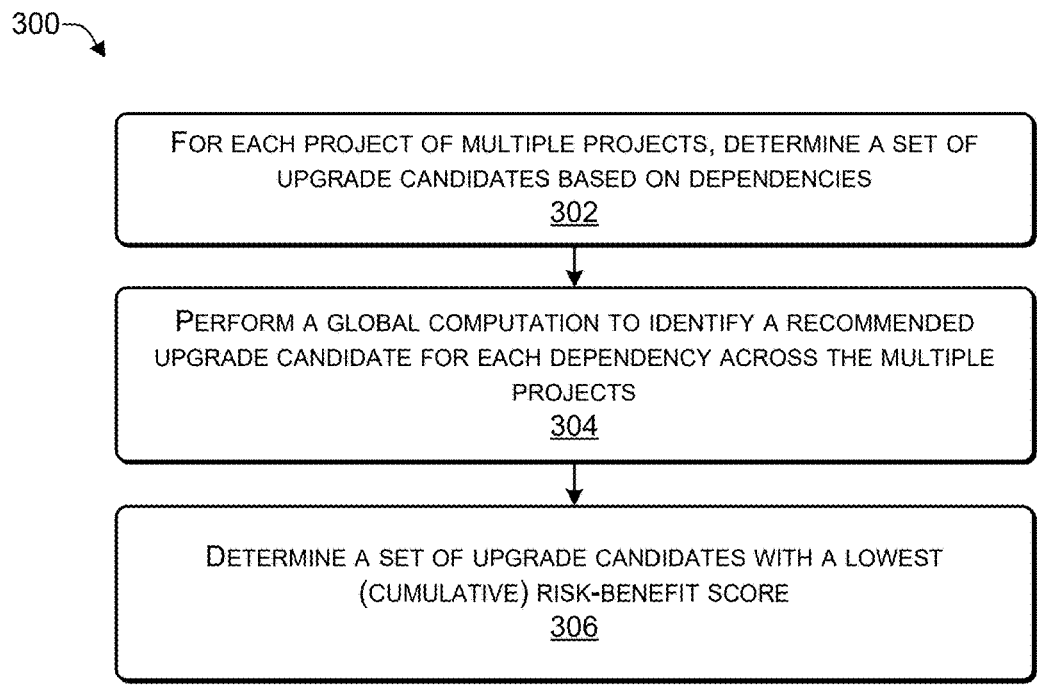
FIG. 3 is a process to create a recommended upgrade for multiple projects, according to some embodiments.

In the flow diagrams of FIGS. 2 and 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. The processes 200 and 300 may be implemented using various models, frameworks, systems and environments.

FIG. 2 is a process 200 to create a prioritized subset of upgrade candidates, according to some embodiments. The process 200 may be performed by the recommendation engine 128 of FIG. 1.

At 202, the process may select a package in a project. At 204, the process may determine a set of dependencies (in third-party code) associated with the package. For example, in FIG. 1, the recommendation engine 128 may select a particular package of the packages 124 and determine the dependencies 126 associated with the particular package. For example, the dependencies 126 may identify one or more components in the third-party libraries 116 that are called by code in the particular package.

At 206, for each dependency in the set of dependencies, the process may determine a set of upgrade candidates. At 208, if the number of update candidates in the set of upgrade candidates is greater than a threshold number, then the process may heuristically select a subset of the upgrade candidates. For example, in FIG. 1, for each dependency in the dependencies 126, the recommendation engine 128 may determine the set of upgrade candidates 139. For example, the upgrade candidates 139 may include all available versions of a particular component 118 and the third-party libraries 116. To illustrate, if the project function 114 uses the component function 120(C1), the set of upgrade candidates 139 may include the component functions 120(C2) to 120(CN). If the recommendation engine 128 determines that the number of upgrade candidates in the set of upgrade candidates 139 is greater than a predetermined threshold, then the recommendation engine 128 may heuristically select the subset 140. For example, if the predetermined threshold is six and there are five upgrade candidates, then the recommendation engine 128 uses all five of the upgrade candidates as the subset 140. If the predetermined threshold is six and there are 10 upgrade candidates (V1.1.0 to V1.1.9), then the recommendation engine 128 may heuristically select the first three versions (e.g., V1.1.0, V1.1.1, V1.1.2) and the last three versions (e.g., V1.1.7, V1.1.8, V1.1.9) for inclusion in the subset 140.

At 210, the process may select an upgrade candidate in the subset of upgrade candidates and determine whether upgrading would cause an issue (e.g., a breaking change). At 212, the process may emulate a state of a dependency graph for the package if the package were modified to use the upgrade candidate. At 214, the process may determine if there are any diamond dependencies. At 216, the process may determine a number of vulnerabilities addressed if the package were modified to use the upgrade candidate. At 218, the process may determine other information associated with the upgrade candidate, such as, for example, a quality score, security score, a popularity score, an activity score, a number of licenses, and the like. At 220, the process may determine a risk-benefit score for each upgrade candidate in the subset of upgrade candidates based on the information gathered, including the state of the dependency graph, diamond dependencies, number vulnerabilities addressed, and other information (quality score, security score, popularity score, activity score, number of licenses, and the like) associated with each upgrade candidate. At 222, the process may prioritize each upgrade candidate in the set of upgrade candidates based on the risk-benefit score and provide a prioritized subset of upgrade candidates to a code developer associated with the package. For each upgrade candidate, e.g. the component functions 120(1) to 120(P), in the subset 140, the recommendation engine 128 may determine an associated risk-benefit score 134 based on multiple factors. The risk-benefit score 134 may be determined based on determining whether upgrading to the associated component function 120 would cause an issue such as a breaking change. The risk-benefit score 134 may be determined based on emulating a state of the dependency graph 125 for the package if the package were modified to use the component function 120. The risk-benefit score 134 may be determined based on determining if there are any diamond dependencies for the associated component function 120. The risk-benefit score 134 may be determined based on a number of vulnerabilities addressed if the package were modified to use the upgrade candidate (component function 120). The risk-benefit score 134 may be determined based on other information, such as a quality score 156, a security score 154, a popularity score 152, an activity score 150, a number of licenses 158, and the like. The component functions 120 in the subset 140 may be ordered based on the risk-benefit scores 134 to create the prioritized subset 144, with the lowest risk upgrade candidates being listed first and the highest risk upgrade candidates being listed last. The recommendation engine 128 may present the prioritized subset 144 to one or more code developers associated with the package that was analyzed to enable the code developers to make an informed decision as to which upgrade candidates to use to address as many issues (e.g., vulnerabilities) as possible and to reduce the number of additional issues introduced by using the upgrade candidates.

Thus, a project may be analyzed to determine dependencies in each particular package included in the project. The dependencies are relationships between the package and third-party libraries, such as open-source software. For example, the code in the package may call functions or import types in the third-party library. For each dependency, a recommendation engine may determine a set of upgrade candidates. If the number of upgrade candidates in the set of upgrade candidates is greater than a threshold amount, then the recommendation engine may heuristically select a subset of the upgrade candidates. For each upgrade candidate in the subset of upgrade candidates, the recommendation engine may determine various information, such as whether upgrading would cause an issue (e.g., a breaking change), determine if there are any diamond dependencies, emulate a state of a dependency graph for the package if the package were upgraded to use the upgrade candidate, determine a number of vulnerabilities addressed if the package were to use the upgrade candidate, and determine other information, such as a quality score, a security score, popularity score, an activity score, a number of licenses, and the like. Based on the various information, the recommendation engine may determine a risk-benefit score for each up grade candidate in the subset of upgrade candidates and prioritize each upgrade candidate based on the risk-benefit score to provide a prioritized subset to a developer associated with the package.

FIG. 3 is a process 300 to create a recommended upgrade for multiple projects, according to some embodiments. The process 300 may be performed by the recommendation engine 128 of FIG. 1.

At 302, the process determines, for each project of multiple projects, determine a set of upgrade candidates based on dependencies in the project. At 304, the process performs a global computation to identify a recommended upgrade candidate for each dependency in each project across the multiple projects. At 306, the process determines a set of upgrade candidates with a lowest (cumulative) risk-benefit score. For example, in FIG. 1, the recommendation engine 128 determines, for each project of multiple projects 123, determine the set of upgrade candidates 139 based on dependencies 126 in each of the projects 123. The recommendation engine 128 performs a global computation to identify a recommended upgrade candidate (from the set of upgrade candidates 139) for each of the dependencies 126 in each of the projects 123 across the multiple projects 123. The recommendation engine 128 determines the prioritized subset of upgrade candidates with a lowest (cumulative) risk-benefit score.

The recommendation engine 128 may operate across multiple projects. For each project, the recommendation engine 128 determines the recommended upgrades of direct dependencies At the end, the recommendation engine 128 does a global computation to find the recommended upgrade candidates across the multiple projects. The recommendation engine 128 aligns the upgrades across the multiple projects. For example, the recommendation engine 128 may recommend upgrading project A from dependency D@v1 to D@v4. If project A were not taken into account when determining upgrades for project B, the recommendation engine 128 may recommend upgrading project B from D@v2 to D@v3. To align recommendations across multiple projects, the recommendation engine 128 may recommend upgrading to a same version (e.g., D@v4). This results in a smaller number of different versions across all projects 123 after the upgrade (e.g., D@v4, instead of both D@v4 and D@v3), making the code easier to maintain.

Figure 4:
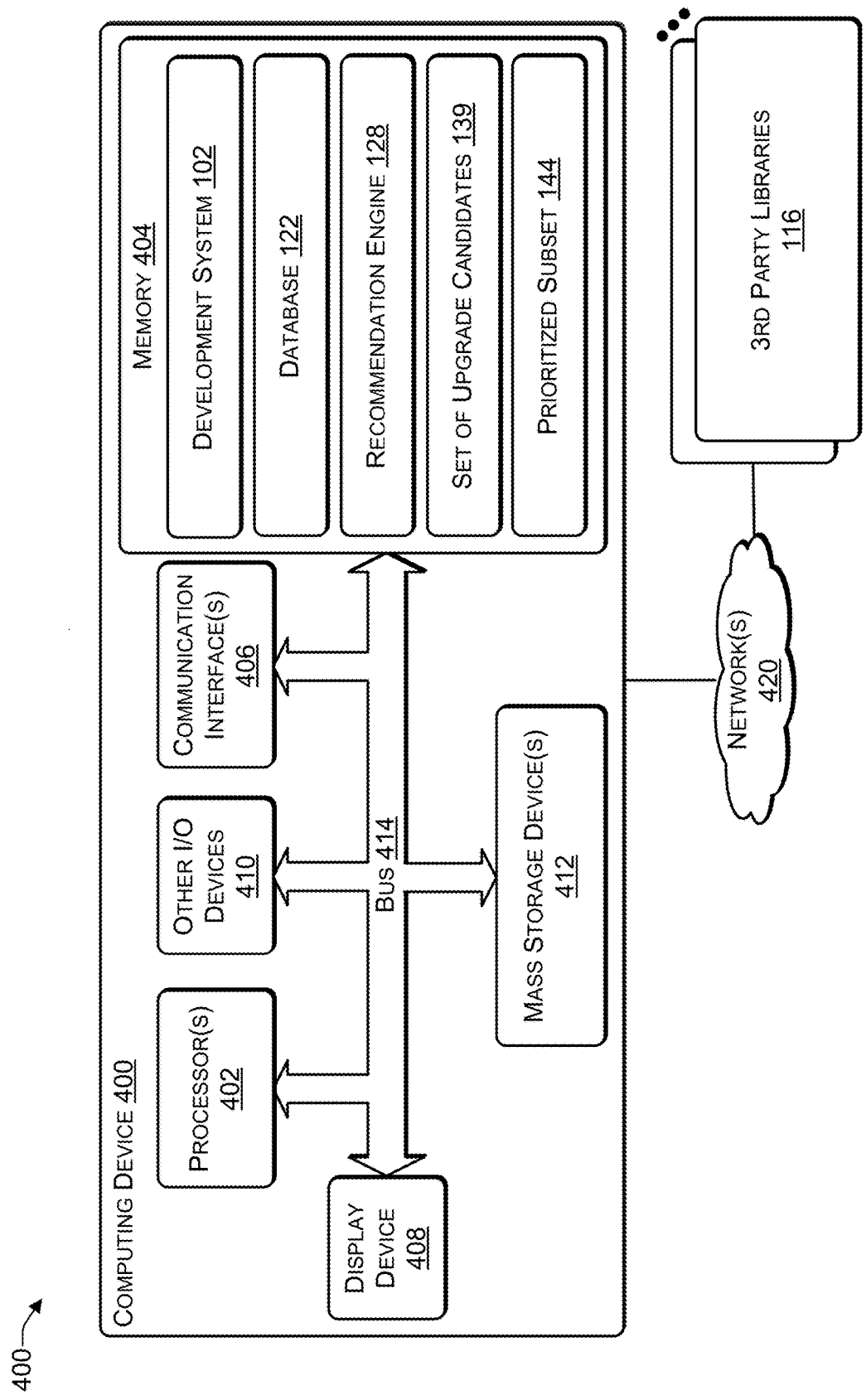
FIG. 4 is a block diagram of a computing device with memory, processors, storage, and network components for vulnerability management, highlighting the various modules configured to perform the steps of the vulnerability identification and addressing process.

FIG. 4 illustrates an example configuration of a computing device that can be used to implement the systems and techniques described herein, such as hosting the development system 102 of FIG. 1 or being used to train the AI 146. The computing device 400 may include one or more processors 402 (e.g., central processing unit (CPU), graphics processing unit (GPU), AI processing units (AIPU), or any combination thereof), a memory 404, communication interfaces 406, a display device 408, other input/output (I/O) devices 410 (e.g., keyboard, trackball, and the like), and one or more mass storage devices 412 (e.g., disk drive, solid state disk drive, or the like), configured to communicate with each other, such as via one or more system buses 414 or other suitable connections. While a single system bus 414 is illustrated for ease of understanding, it should be understood that the system buses 414 may include multiple buses, such as a memory device bus, a storage device bus (e.g., serial ATA (SATA) and the like), data buses (e.g., universal serial bus (USB) and the like), video signal buses (e.g., Thunder-Bolt®, digital video interface (DVI), High-Definition Multimedia Interface (HDMI), and the like), power buses, etc.

The processors 402 are one or more hardware devices that may include a single processing unit or a number of processing units, all of which may include single or multiple computing units or multiple cores. The processors 402 may include a GPU and/or AIPU that is integrated into the CPU or the GPU and/or AIPU may be a separate processor device from the CPU. The processors 402 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 402 are configured to fetch and execute computer-readable instructions stored in the memory 404, mass storage devices 412, and other types of non-transitory computer-readable media.

Memory 404 and mass storage devices 412 are examples of non-transitory computer storage media (e.g., memory storage devices) for storing instructions that can be executed by the processors 402 to perform the various functions described herein. For example, memory 404 may include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., compact disc (CD), digital versatile disc (DVD)), a storage array, a network attached storage, a storage area network, or the like. Both memory 404 and mass storage devices 412 may be collectively referred to as memory or computer storage media herein and include any type of non-transitory media capable of storing computer-readable, processor-executable program instructions as computer program code that can be executed by the processors 402 as a particular machine configured for carrying out the operations and functions described in the implementations herein.

The computing device 400 may include one or more communication interfaces 406 for exchanging data via the network(s) 420. The communication interfaces 406 can facilitate communications within a wide variety of networks and protocol types, such as a representative network 420 that may include wired networks (e.g., Ethernet, DOCSIS, DSL, Fiber, USB etc.) and wireless networks (e.g., WLAN, GSM, CDMA, 802.11, Bluetooth®, Wireless USB, ZigBee®, cellular, satellite, etc.), the Internet and the like. Communication interfaces 406 can also provide communication with external storage, such as a storage array, network attached storage, storage area network, cloud storage, or the like.

The display device 408 may be used for displaying content (e.g., information and images) to users. Other I/O devices 410 may be devices that receive various inputs from a user and provide various outputs to the user, and may include a keyboard, a touchpad, a mouse, a printer, audio input/output devices, and so forth.

The computer storage media, such as memory 404 and mass storage devices 412, may be used to store software and data as shown in FIG. 4. For example, the memory 404 may be used to store the development system 102, the database 122, the recommendation engine 128, the set of upgrade candidates, and the prioritized subset 144. The computing device 400 may be connected to one or more third-party libraries 116 via one or more networks 420.

The systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method executed by one or more processors, the method comprising:
    determining a set of dependencies associated with a package in a software project stored in a database, wherein individual dependencies of the set of dependencies are located in one or more of network accessible third-party libraries that include at least one open-source library;
    determining a set of upgrade candidates for a particular dependency in the set of dependencies;
    based on determining that a number of upgrade candidates in the set of upgrade candidates is greater than a predetermined threshold, selecting a subset of the upgrade candidates by selecting a predetermined number of versions of the upgrade candidates;
    selecting an upgrade candidate in the subset of the upgrade candidates;
    determining issues associated with upgrading the package to use the upgrade candidate;
    emulating a state of a dependency graph associated with upgrading the package to use the upgrade candidate;
    determining diamond dependencies in the dependency graph associated with upgrading the package to use the upgrade candidate;
    determining a number of vulnerabilities addressed by upgrading the package to use the upgrade candidate;
    determining a severity of vulnerabilities addressed by upgrading the package to use the upgrade candidate;
    determining a risk-benefit score associated with each upgrade candidate in the subset of the upgrade candidates based at least in part on:
        the issues associated with upgrading the package to use the upgrade candidate;
        the diamond dependencies in the dependency graph associated with upgrading the package to use the upgrade candidate;
        the number of vulnerabilities addressed by upgrading the package to use the upgrade candidate; and
        the severity of the vulnerabilities addressed by upgrading the package to use the upgrade candidate;
    prioritizing each of the upgrade candidates in the subset of the upgrade candidates based on the associated risk-benefit score to create a prioritized subset of the upgrade candidates; and
    providing, on a display device, the prioritized subset of the upgrade candidates to a developer associated with the package.

2. The computer-implemented method of claim 1, wherein determining the issues associated with upgrading the package to use the upgrade candidate comprises:
    determining a number of breaking changes associated with upgrading the package to use the upgrade candidate.

3. The computer-implemented method of claim 1, wherein determining the issues associated with upgrading the package to use the upgrade candidate comprises:
    determining an activity score indicating an amount of development activity associated with a third-party package in which the upgrade candidate is included.

4. The computer-implemented method of claim 1, wherein determining the issues associated with upgrading the package to use the upgrade candidate comprises:
    determining a security score indicating a number of security-related issues associated with a third-party package in which the upgrade candidate is included.

5. The computer-implemented method of claim 1, wherein determining the issues associated with upgrading the package to use the upgrade candidate comprises:
    determining a popularity score indicating an amount of usage received by a particular third-party package based at least in part on:
        tracking source code management system metrics; and
        how many other packages have a dependency on the particular third-party package.

6. The computer-implemented method of claim 1, wherein determining the issues associated with upgrading the package to use the upgrade candidate comprises:
    determining a code quality score indicating how well a particular third-party package complies with best practices for code development.

7. The computer-implemented method of claim 1, wherein determining the issues associated with upgrading the package to use the upgrade candidate comprises:
    determining a number of licenses associated with the upgrade candidate.

8. A server comprising:
    one or more processors; and
    one or more non-transitory computer readable media storing instructions executable by the one or more processors to perform operations comprising:
        determining a set of dependencies associated with a package in a software project stored in a database, wherein individual dependencies of the set of dependencies are located in one or more of network accessible third-party libraries that include at least one open-source library;
        determining a set of upgrade candidates for a particular dependency in the set of dependencies;
        based on determining that a number of upgrade candidates in the set of upgrade candidates is greater than a predetermined threshold, selecting a subset of the upgrade candidates by selecting a predetermined number of versions of the upgrade candidates;
        selecting an upgrade candidate in the subset of the upgrade candidates;
        determining issues associated with upgrading the package to use the upgrade candidate;
        emulating a state of a dependency graph associated with upgrading the package to use the upgrade candidate;
        determining diamond dependencies in the dependency graph associated with upgrading the package to use the upgrade candidate;
        determining a number of vulnerabilities addressed by upgrading the package to use the upgrade candidate;
        determining a severity of vulnerabilities addressed by upgrading the package to use the upgrade candidate;
        determining a risk-benefit score associated with each upgrade candidate in the subset of the upgrade candidates based at least in part on:
            the issues associated with upgrading the package to use the upgrade candidate;
            the diamond dependencies in the dependency graph associated with upgrading the package to use the upgrade candidate;
            the number of vulnerabilities addressed by upgrading the package to use the upgrade candidate; and
            the severity of the vulnerabilities addressed by upgrading the package to use the upgrade candidate;

prioritizing each of the upgrade candidates in the subset of the upgrade candidates based on the associated risk-benefit score to create a prioritized subset of the upgrade candidates; and providing, on a display device, the prioritized subset of the upgrade candidates to a developer associated with the package.

9. The server of claim 8, the operations further comprising:

determining a recommended global upgrade candidate for individual dependencies in a global set of dependencies across multiple projects, wherein each individual projects of the multiple projects includes one or more packages; and determining a set of global upgrade candidates for the multiple projects.

10. The server of claim 9, wherein determining the set of global upgrade candidates for the multiple projects comprises:

performing a global computation to identify the recommended global upgrade candidate for the individual dependencies in the global set of dependencies across the multiple projects.

11. The server of claim 9, wherein determining the set of global upgrade candidates for the multiple projects comprises:

determining the set of global upgrade candidates having a lowest cumulative risk-benefit score.

12. The server of claim 8, wherein determining the issues associated with upgrading the package to use the upgrade candidate comprises any combination of one or more of:

determining a number of breaking changes associated with upgrading the package to use the upgrade candidate; and/or determining an activity score indicating an amount of development activity associated with a third-party package in which the upgrade candidate is included; and/or determining a security score indicating a number of security-related issues associated with the third-party package in which the upgrade candidate is included; and/or determining a popularity score indicating an amount of usage received by a particular third-party package based at least in part on:

tracking source code management system metrics; and how many other packages have a dependency on the particular third-party package.

13. The server of claim 8, wherein determining the set of dependencies associated with the package comprises: ignoring test dependencies.

14. The server of claim 8, wherein determining the set of dependencies associated with the package comprises: ignoring unused dependencies.

15. One or more non-transitory computer readable media capable of storing instructions executable by one or more processors to perform operations comprising:

determining a set of dependencies associated with a package in a software project stored on a database, wherein individual dependencies of the set of dependencies are located in one or more of network accessible third-party libraries that include at least one open-source library;

determining a set of upgrade candidates for a particular dependency in the set of dependencies;

based on determining that a number of upgrade candidates in the set of upgrade candidates is greater than a predetermined threshold, selecting a subset of the upgrade candidates by selecting a predetermined number of versions of the upgrade candidates;

selecting an upgrade candidate in the subset of the upgrade candidates;

determining issues associated with upgrading the package to use the upgrade candidate;

emulating a state of a dependency graph associated with upgrading the package to use the upgrade candidate;

determining diamond dependencies in the dependency graph associated with upgrading the package to use the upgrade candidate;

determining a number of vulnerabilities addressed by upgrading the package to use the upgrade candidate;

determining a severity of vulnerabilities addressed by upgrading the package to use the upgrade candidate;

determining a risk-benefit score associated with each upgrade candidate in the subset of the upgrade candidates based at least in part on:

the issues associated with upgrading the package to use the upgrade candidate;

the diamond dependencies in the dependency graph associated with upgrading the package to use the upgrade candidate;

the number of vulnerabilities addressed by upgrading the package to use the upgrade candidate; and the severity of the vulnerabilities addressed by upgrading the package to use the upgrade candidate;

prioritizing each of the upgrade candidates in the subset of the upgrade candidates based on the associated risk-benefit score to create a prioritized subset of the upgrade candidates; and providing, on a display device, the prioritized subset of the upgrade candidates to a developer associated with the package.

16. The one or more non-transitory computer readable media of claim 15, the operations further comprising:

determining a recommended upgrade candidate for individual dependencies in a set of project dependencies across multiple projects, wherein individual projects of the multiple projects include one or more packages.

17. The one or more non-transitory computer readable media of claim 16, the operations further comprising:

determining a set of global upgrade candidates for the multiple projects in the set of project dependencies.

18. The one or more non-transitory computer readable media of claim 17, wherein determining the set of global upgrade candidates for the multiple projects comprises:

determining the set of global upgrade candidates with a lowest cumulative risk-benefit score.

19. The one or more non-transitory computer readable media of claim 16, the operations further comprising:

performing a global computation to identify a recommended global upgrade candidate for the individual dependencies in the set of project dependencies across the multiple projects.

20. The one or more non-transitory computer readable media of claim 15, wherein determining the issues associated with upgrading the package to use the upgrade candidate comprises:

determining a code quality score indicating how well a particular third-party package complies with best practices for code development.

* * * * *